US005392063A

United States Patent [19]

Rhoads

[11] Patent Number: 5,392,063

[45] Date of Patent: Feb. 21, 1995

[54] SPRING CARTRIDGE CLAMP FOR INKJET PRINTER CARRIAGE

[75] Inventor: W. Wistar Rhoads, Escondido, Calif.

[73] Assignee: Hewlett-Packard Company, Palo Alto, Calif.

[21] Appl. No.: 56,702

[22] Filed: Apr. 30, 1993

[51] Int. Cl.[6] .................... G01D 15/16; G11B 33/06

[52] U.S. Cl. .................... 347/49; 347/86; 312/9.63

[58] Field of Search .................... 346/140 R; 347/86, 87, 347/49, 50; 312/9.48, 9.52, 9.53, 9.55, 9.57, 9.63

[56] References Cited

U.S. PATENT DOCUMENTS

| | | | |
|---|---|---|---|
| 4,703,333 | 10/1987 | Hubbard | 346/140 R |
| 4,736,213 | 5/1988 | Piatt et al. | 346/140 R |
| 4,755,836 | 7/1988 | Ta | 346/140 |
| 4,844,564 | 7/1989 | Price, Sr. et al. | 312/12 |
| 4,872,026 | 10/1989 | Rasmussen | 346/140 |

*Primary Examiner*—Benjamin R. Fuller
*Assistant Examiner*—Craig A. Hallacher

[57] ABSTRACT

A unitary latch assembly secures all four cartridges of an inkjet printer inside their respective cartridge compartments of cartridge holder by means of a metallic spring and four forwardly facing latch ends separated by five respective forwardly facing supporting ends. Each latch end is connected to its two adjacent supporting ends by a serpentine arm defined by suitable radiused cutouts in the stamped spring to provide a shape that approximates a constant stress geometry. Each supporting end is terminated by a straight edge which is inserted into a corresponding slot at the upper rear of cartridge holder; because the latch assembly is a single unit, only one assembly operation is required for all four cartridge compartments. Each latch end is provided with a cam molded of a low friction material and shaped in the form of a horizontal section of an inclined cylinder. A lower tangential plane on the cylindrical surface intersects the plane of the latch end at an oblique angle, thereby producing a sideways force component to maintain a datum surface on an upper side edge of the cartridge in contact with a corresponding supporting surface on an interior side wall of the cartridge holder.

4 Claims, 9 Drawing Sheets

SPRING CARTRIDGE CLAMP FOR INKJET PRINTER CARRIAGE

TECHNICAL FIELD

The present invention relates generally to inkjet printers having multiple printing cartridges each having its own nozzle assembly and ink reservoir, and more particularly to a spring clamp for ensuring accurate and stable alignment of the cartridges when installed in a printer having a multiple compartment cartridge holder.

CROSS-REFERENCE TO RELATED APPLICATIONS

The following commonly assigned U.S. patent application claims an invention which, although believed to be patentably distinguishable, may be related to the present invention:

D. W. Swanson et al, "Side Biased Datum Scheme for Inkjet Cartridge and Carriage", filed concurrently herewith under Ser. No. 08/067,241.

BACKGROUND ART

From U.S. Pat. No. 4,755,836 it is known to provide an inkjet printer with a pair of replaceable printing cartridges (each having at least one nozzle assembly and associated ink reservoir) mounted on a common carriage, and to maintain registration between the cartridges and the carriage by means of alignment and registration features such as protuberances, shims, opening and surfaces. A separate latch mechanism is provided for each cartridge which provides a loading force in all three coordinate axes and cooperates with the registration and alignment features to prevent pitch, yaw and roll of the cartridge.

From U.S. Pat. No. 4,872,026 it is known to facilitate the installation of a single inkjet cartridge by providing a lower pivot below an electrical interface, adjacent the intersection of the contact and nozzle planes, with the single cartridge being held in its installed position by an appropriately shaped upper latch spring.

SUMMARY OF THE INVENTION

In accordance with one aspect of the present invention, a unitary latch assembly secures a plurality of cartridges inside their respective cartridge compartments of a cartridge holder for an inkjet printer. Because the latch assembly is a single unit, only one assembly operation is required for all four cartridge compartments.

More specifically, the unitary latch assembly may comprise a metallic spring and a plurality of forwardly facing latch ends separated by respective forwardly facing supporting ends. Each latch end is preferably connected to its two adjacent supporting ends by a serpentine arm defined by suitable radiused cutouts in the stamped spring to provide a shape that approximates a constant stress geometry; each supporting end is preferably terminated by a straight edge which is inserted into a corresponding slot at the upper rear of cartridge holder. Because of the serpentine shape of the individual serpentine arm, it is possible to provide a spring that is relatively compact from front to rear and yet provides a substantial downwards force on the top rear of the cartridge over a relatively large deflection range.

In accordance with another aspect, each latch end is provided with a cam preferably molded of a low friction material and shaped in the form of a horizontal section of an inclined cylinder. A lower tangential plane on the cylindrical surface intersects the plane of the latch end at an oblique angle, thereby producing a sideways force component to maintain a datum surface on an upper side edge of the cartridge in contact with a corresponding supporting surface on an interior side wall of the cartridge holder.

BRIEF DESCRIPTION OF THE DRAWINGS

Other objects and features of the present invention will be apparent from the following description of a presently preferred embodiment taken in connection with the accompanying drawings, in which:

FIG. 2 comprising

FIG. 3 comprising

FIG. 10 comprising

DETAILED DESCRIPTION OF THE PREFERRED EMBODIMENT

Figure 1:
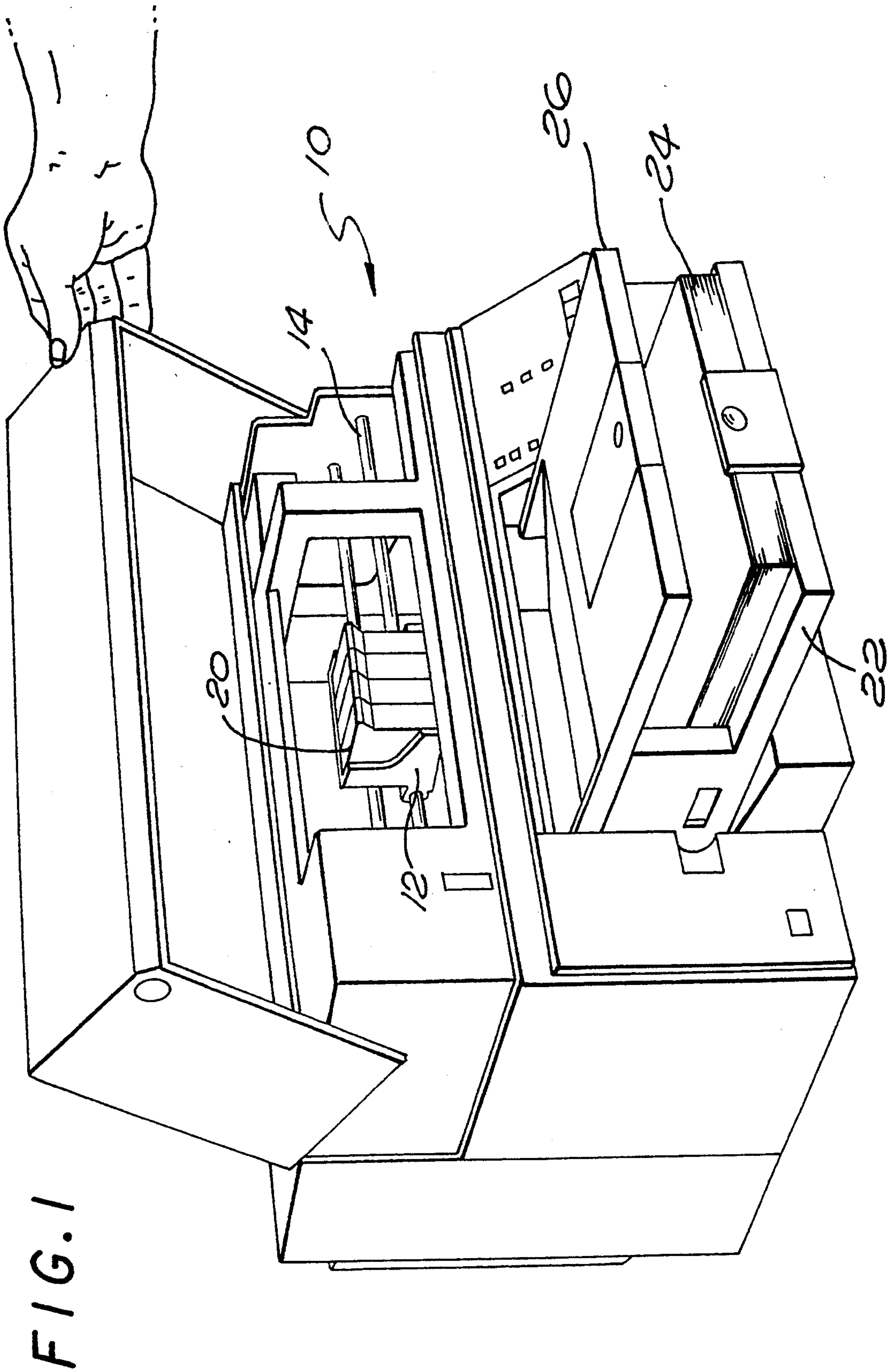
FIG. 1 is an isometric view showing the major components of an inkjet printer incorporating the present invention.
Figure 5:
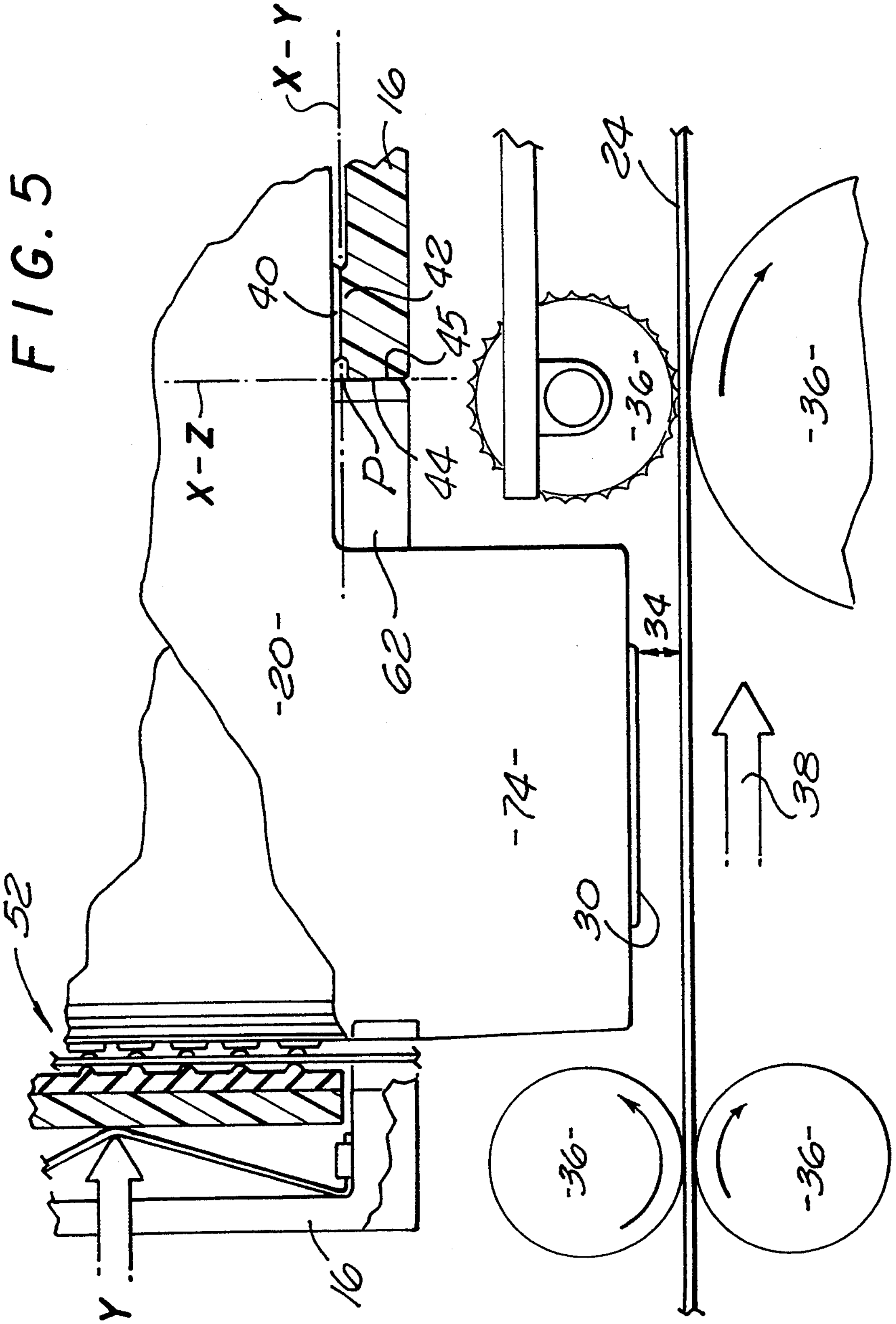
FIG. 5 is another side view, partly in cross section, showing the cartridge and a corresponding portion of the cartridge holder with their respective contacts engaged to thereby provide a registration force in the Y axis, and also showing the snout of the cartridge in its operational position relative to an advancing sheet of print media.

FIG. 1 shows a small footprint, high quality inkjet printer 10 incorporating the present invention. In particular, inkjet printer 10 includes a movable carriage 12 supported on a rail 14. As best shown in FIG. 2C, movable carriage 12 includes a cartridge holder 16 provided with a plurality of individual cartridge compartments 18 for receiving a respective plurality of thermal ink jet printer cartridges 20. Inkjet printer 10 also is provided with input tray 22 containing a number of sheets of bond paper or other suitable ink-receiving medium 24, and an tipper output tray 26 for receiving the printed media. As best shown in FIG. 5, each cartridge 20 is supported above the ink-receiving medium 24 by the cartridge holder 16, such that a nozzle plate 30 on lower surface 32 (FIG. 38) is maintained an appropriate distance 34 from ink-receiving medium 24. As is conventional in inkjet printers, inkjet printer 10 is also provided with feed rollers 36 which maintain the print medium 24 in a taut condition as it passes under the nozzle plate 30, and which advance ink-receiving medium 24 in a direction 38 perpendicular to the carriage axis defined by rail 14.

Figure 2A:
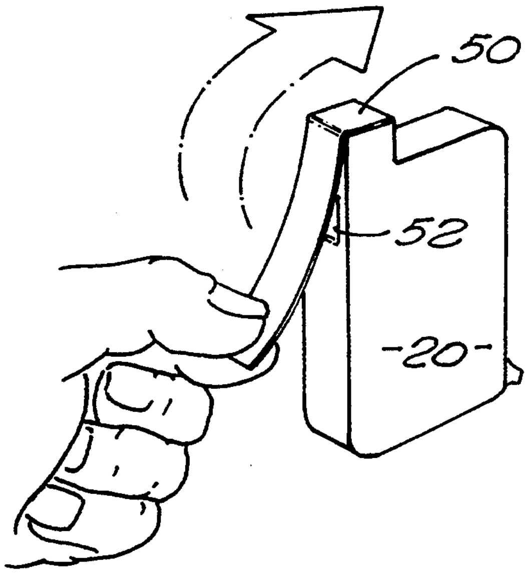
FIGS. 2A, 2B, and 2C are isometric views showing one of printer "cartridges" of FIG. 1 being inserted into a corresponding slot of the cartridge holder.
Figure 2B:
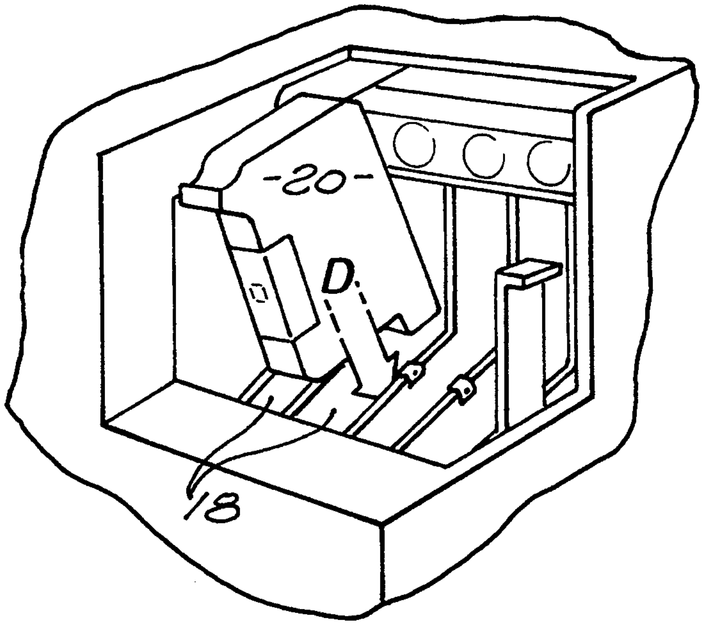
Figure 2C:
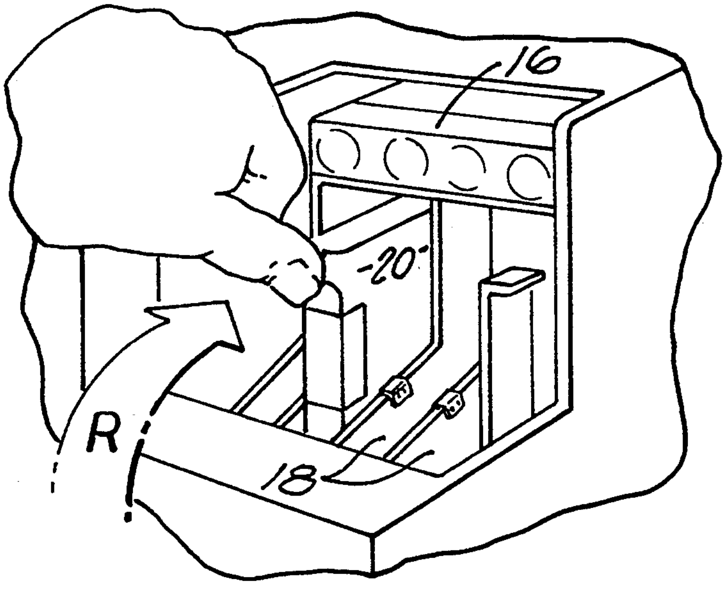

Referring now to FIG. 2, comprising FIGS. 2A, 2B, and 2C, it will be seen that cartridge 20 is installed by pushing it into its cartridge compartment 18 with a natural downward motion D until its horizontal datum surface 40 (see FIGS. 4 and 5) contacts the corresponding supporting surface 42 on the bottom of the cartridge compartment 18, and then rotating the cartridge 20 rearwardly (FIG. 2C) about a pivot point P (FIG. 5) in the vicinity of the intersection of the horizontal and vertical datum surfaces 40, 44 (FIG. 5) with a natural rearward motion R until an upper datum surface 46 (FIG. 4) contacts a corresponding supporting surface 48 on the upper rear of the cartridge compartment. As shown in FIG. 2A, cartridges 20 are preferably provided with a protective strip 50 which is removed prior to installation to expose the contact surface of an electrical interface 52 carried on rear surface of cartridges 20, as well as nozzle plate 30 (FIG. 3).

Figure 3A:
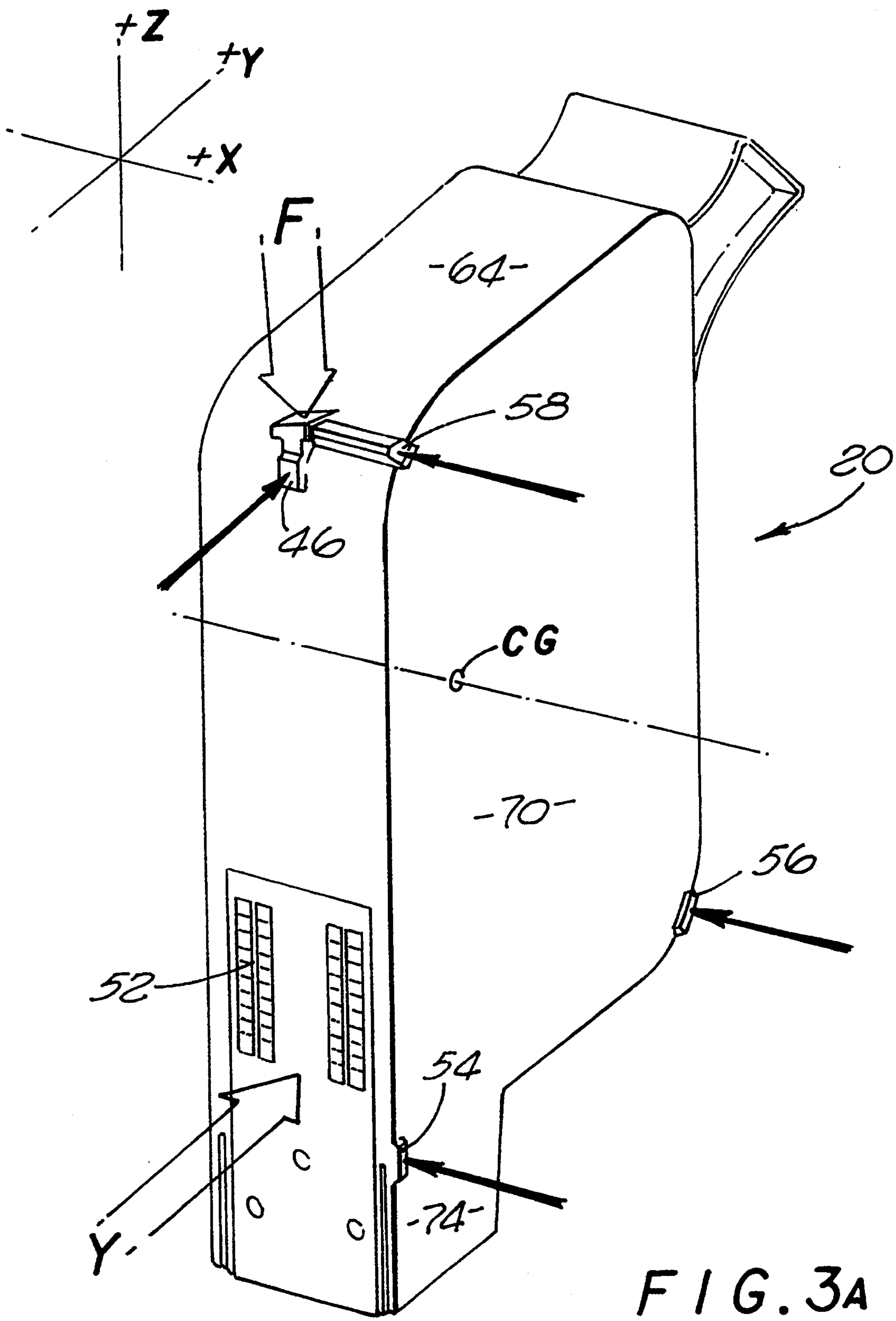
FIGS. 3A and 3B are isometric views of the cartridge of FIG. 2 as seen from the top rear and bottom front, respectively, and show the six "datum" surfaces provided in the cartridge, as well as the various registration forces which are applied to the cartridge to maintain these surfaces against corresponding registration features provided in the cartridge holder.
Figure 3B:
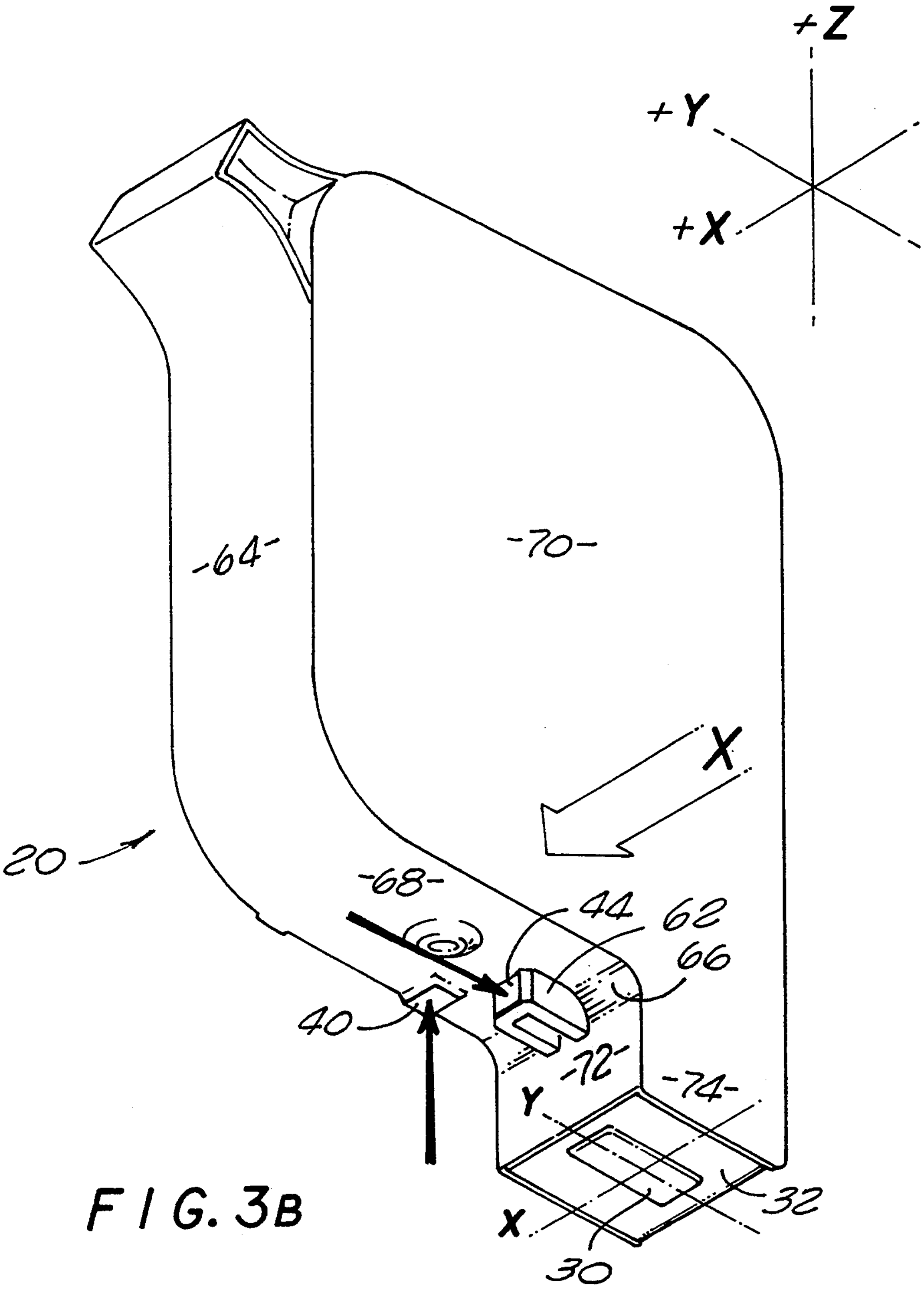
Figure 4:
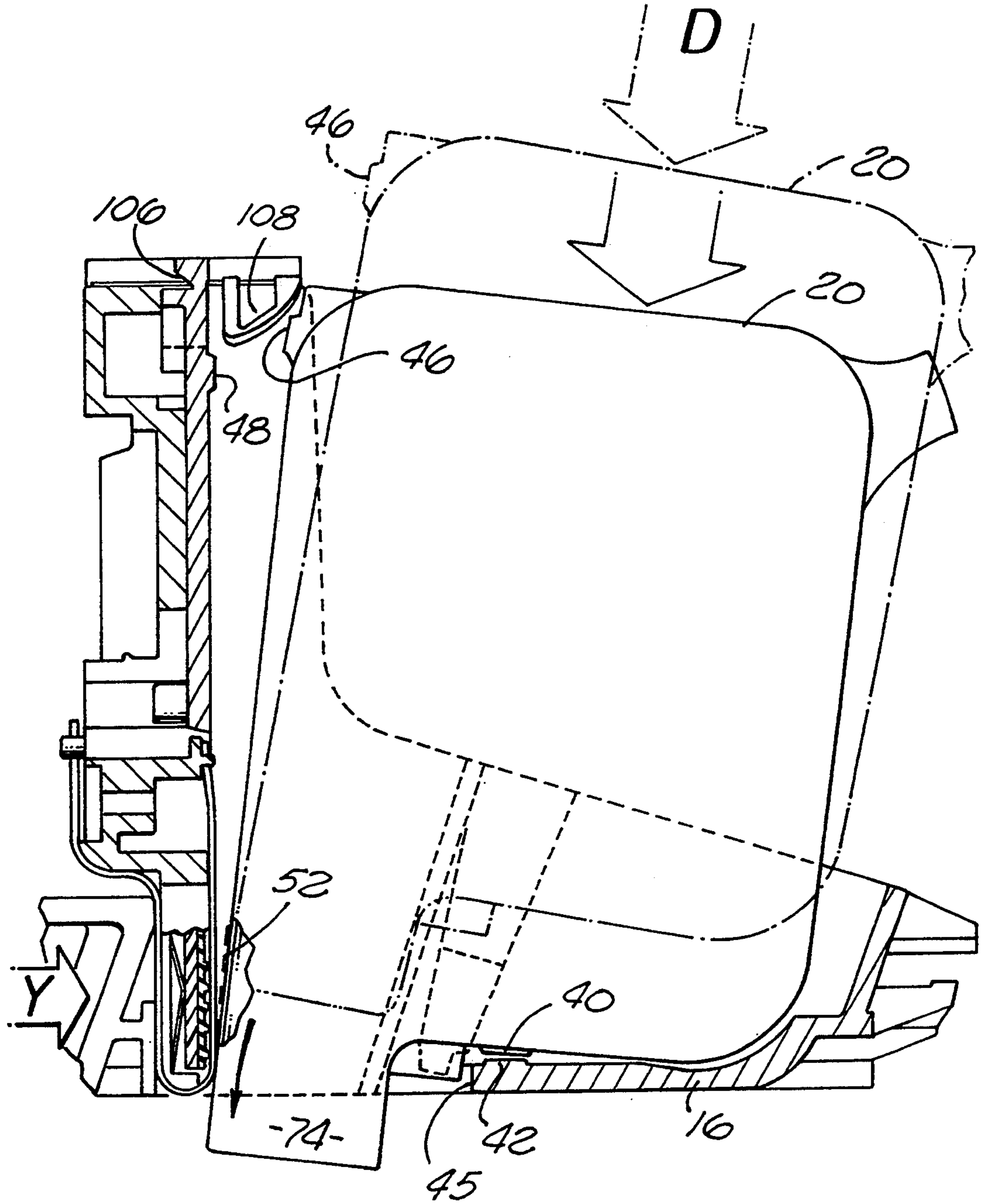
FIG. 4 is a side view, partly in cross section, of the cartridge and a corresponding portion of the cartridge holder, and illustrates the wiping action of their respective electrical contacts as the cartridge is inserted in the cartridge holder.

Reference should now be made to FIG. 3 (comprising FIGS. 3A and 3B, which are isometric views of cartridges 20 as seen from the top rear and bottom front, respectively), which shows the three side-biased "datum" surfaces provided in the cartridge in addition to the above-mentioned datum surfaces 40, 44, 46, namely, three datum surfaces 54, 56, 58 on one side of cartridge 20, which cooperate to define an Y-Z orientation plane substantially perpendicular to the nozzle plane defined by nozzle plate 30 and substantially parallel to its Y axis. It will also be noted that vertical datum surface 44 is defined on a reenforcing bracket 62 integrally formed in the perimeter wall 64 of cartridge 20 at a juncture 66 of a downwardly facing surface 68 of the ink reservoir portion 70 and a forwardly facing portion 72 of the snout portion 74.

Figure 8:
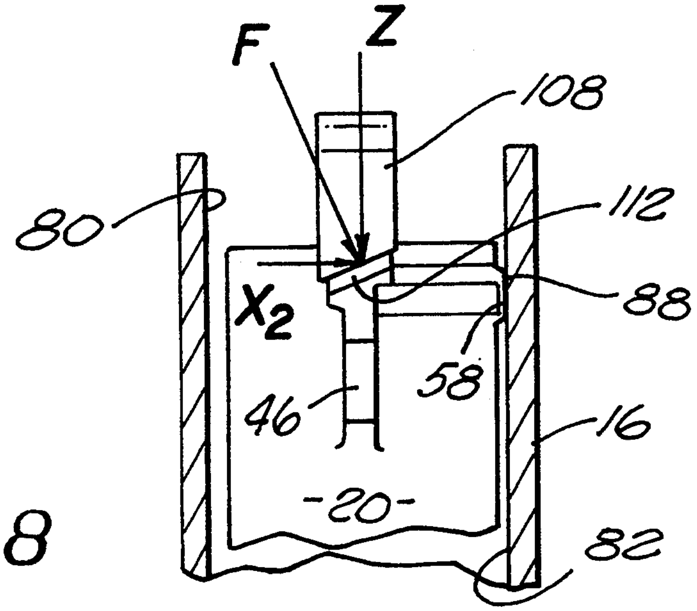
FIG. 8 is a rear view, partly in cross section, taken along line 8—8 of FIG. 7, and shows the two force components produced by the latch spring.

FIG. 3 also shows the various registration forces which when applied to the cartridge 20, serve to maintain these surfaces against corresponding registration features provided in the cartridge holder, namely a first sideways force X1 applied in the +X direction to the lower part of ink reservoir 70, a forward force Y applied in the +Y direction in the vicinity of electrical interface 52, and a third force F applied in the vicinity of upper rear datum surface 46 and upper side datum surface 58 and having a sideways component X2 in the +X direction and a downwards component Z in the Z direction (see FIG. 8). It should be noted that the three side-biased datum surfaces 54, 56, 58 are located on the edge of the perimeter wall 64 of the cartridge 20, thereby providing additional rigidity and positional accuracy relative to the X axis, and are spaced apart from each other in the form of a triangle which surrounds the center of gravity CG of the cartridge, thereby facilitating a more accurate and stable alignment. Furthermore, since the downwards component Z of force F is offset horizontally in the +Y direction from horizontal datum surface 40 and associated supporting surface 42, the resultant counterforce from supporting surface 42 generates a net torque T which rotates cartridge 20 about pivot axis P, thereby forcing upper rear datum surface 46 into contact with sixth supporting surface 48. Because the pivot axis P (FIG. 5) is located above and in front of the snout 74, the electrical interface 52 at the lower rear of the cartridge 20 moves downwards as the cartridge is rotated rearwardly about the pivot axis P during installation, thereby producing an enhanced self-cleaning wiping action between the electrical contact surfaces on the cartridge and the cartridge holder. Moreover, even if force F has a relatively small component in the X direction, because it is at least as far above the center of gravity CG as is the center of gravity above the fulcrum defined by the two lower datum surfaces 54, 56, that relatively small force component will still suffice to prevent the cartridge from tipping sideways from an inertial force of more than twice its magnitude; in an exemplary embodiment, the mass of cartridge 20 is about 115 g and the maximum acceleration of movable carriage 12 is 1.5 g, which would require a force X2 (assuming zero friction) of about 1.75N, compared to an actual value (again assuming zero friction) of about 2.5N.

Of the various datum surfaces and their corresponding supporting surfaces, it should be understood that the most critical tolerances are associated with the two lower side-facing datum surfaces 54, 56 (which ensure that Y axes of the respective nozzle plates are parallel and accurately spaced apart) and with the lower vertical datum surface 44 (which ensures that all the X axes of the nozzle plates are aligned). In an exemplary embodiment, the cartridge 20 has a nominal height (not including snout portion 74) of 78 mm, a depth of 60 mm and a width of 19.18 mm; the nominal center-to-center spacing of the nozzle Y axes (and thus of the cartridges 20 and compartments 18) is 23.241 mm. High quality 4 color printing is obtained when each of the supporting surfaces 84, 86 is held to a tolerance of ±0.025 mm from its nominal spacing to the corresponding surface of an adjacent compartment 18 and the alignment of the three critical supporting surfaces 45, 84, 86 on cartridge holder 16 is such that they do not deviate more than ±0.0125 mm from a respective X-Z or Y-Z plane, and when the corresponding datum surfaces 44, 54, 56 of cartridge 20 do not deviate from the respective X-Z or Y-Z plane defined by the nozzle X and Y nozzle axes by more than ±0.020 mm.

Figure 6:
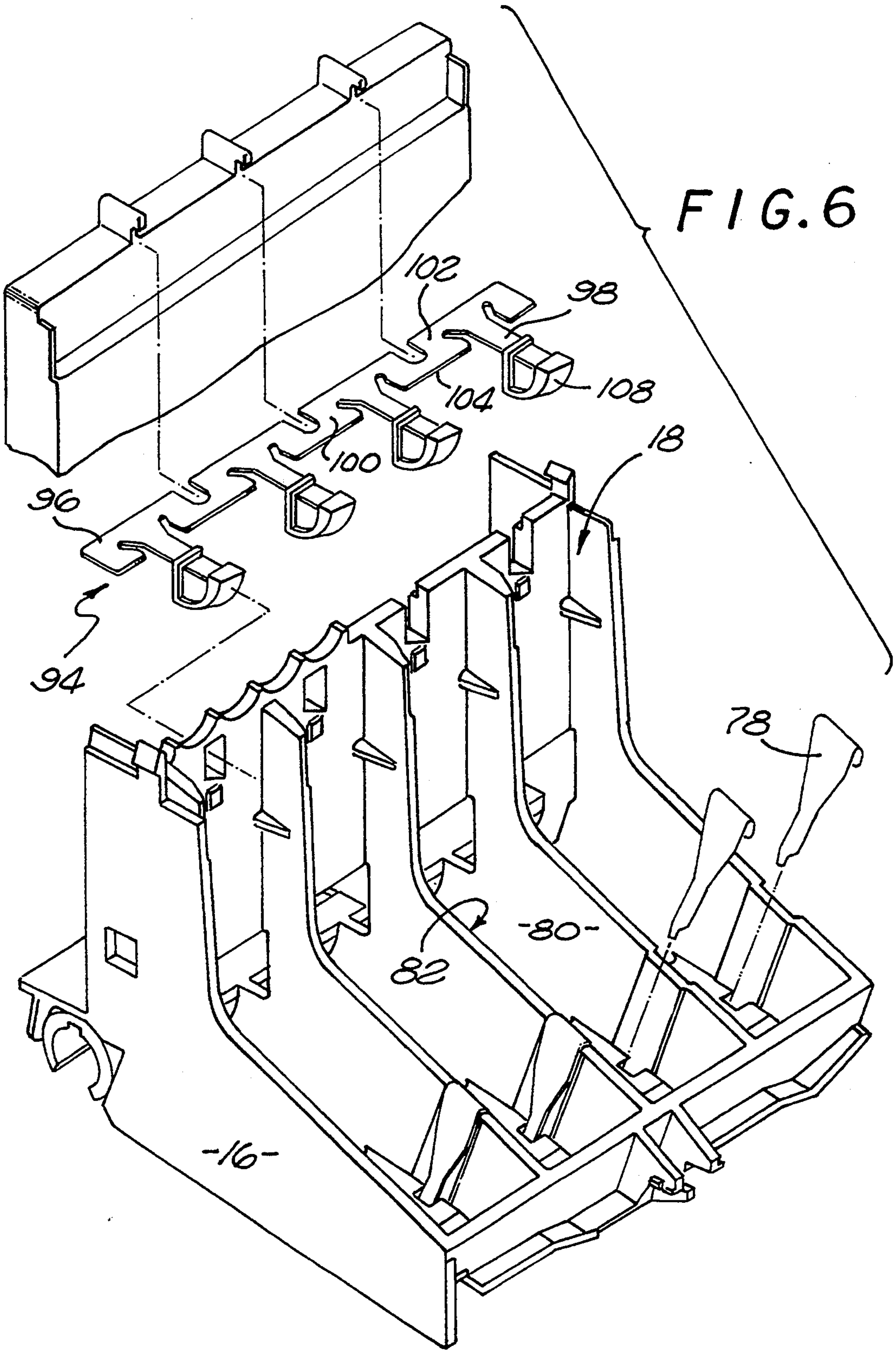
FIG. 6 is an exploded isometric view of the cartridge holder and the various springs which hold the cartridges with their respective datum surfaces in contact with the respective registration features provided in each compartment of the cartridge holder.
Figure 9:
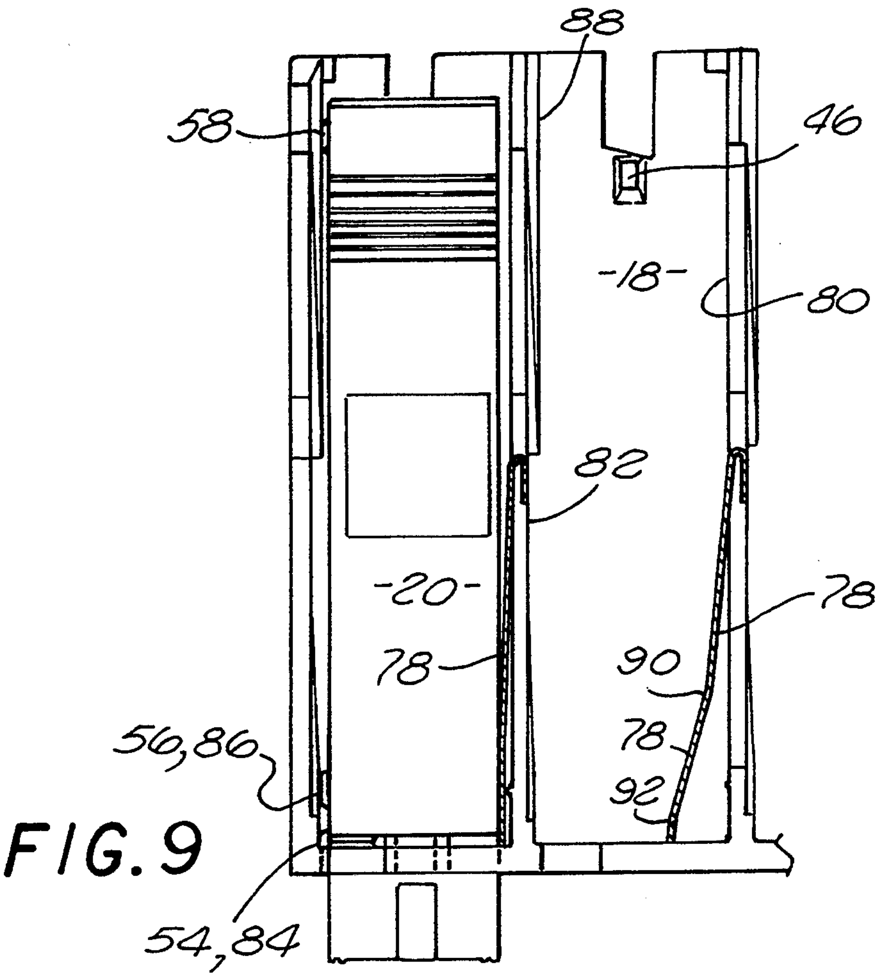
FIG. 9 is a front view, partly in cross section, of respective occupied and empty compartments of the cartridge holder, showing how a relatively thin cantilevered leaf spring provides a sideways bias force in the X axis at the lower end of the cartridge without adding unnecessary width to the cartridge holder.
Figure 10A:
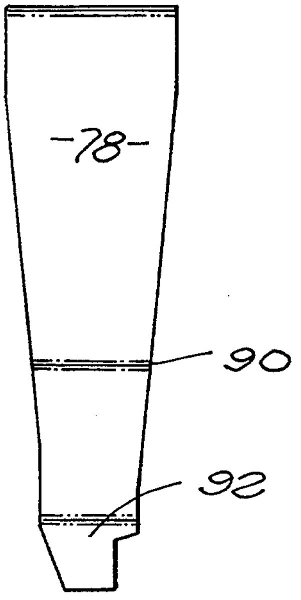
FIGS. 10A and 10B are respective side and front views of the leaf spring of FIG. 9.
Figure 10B:
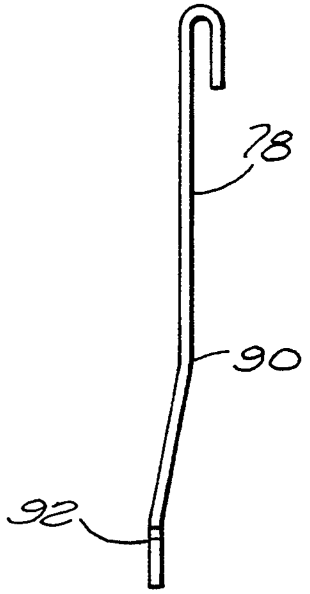

FIG. 6 is an exploded isometric view of the cartridge holder 16 and the various springs which hold the cartridges with their respective datum surfaces in contact with the respective registration features provided in each compartment of the cartridge holder. In particular it will be seen that a downwardly projected cantilevered leaf spring 78 is attached to a sidewall 80 of each cartridge compartment 18 opposite the sidewall 82 (FIG. 9) carrying the three supporting surfaces 84, 86, 88 corresponding to the three datum surfaces 54, 56, 58 (see FIG. 9), which provides the first sideways force X1. Leaf spring 78 is preferably manufactured from spring steel (for example 1050 steel) having a low friction corrosion-resistant coating (for example nickel), to minimize frictional forces between the surface of the spring and the lower edge of cartridge 20 opposite lower datum surfaces 54, 56, which otherwise would generate a countertorque about an axis defined by lower datum surfaces 54, 56 tending to oppose the sideways component X2 and might thus prevent cartridge 20 from assuming its desired orientation relative to the Y-Z plane defined by the three supporting surfaces 84, 86, and 88. As can best be seen in FIGS. 10A and 10B, which comprise respective side and front views of the leaf spring 78, in its uncompressed condition the main portion of leaf spring 78 does not lie flat against sidewall 80, but extends into the interior of compartment 18 at an angle of about 7½° and has a precision bend 90 of about 12° to thereby approximating a circular arc when uncompressed and, when fully compressed, a straight line parallel to sidewall 80 with lower end 92 in contact with the lower end of ink reservoir portion. Leaf spring 78 thus is capable of providing a substantial sideways bias force X1 of approximately 13N at the desired location without adding substantial width to the cartridge holder 16.

The upper portion of FIG. 6 shows a latch assembly 94 for securing all four cartridges 20 inside their respective cartridge compartments 18 of cartridge holder 16. Latch assembly 94 comprises a metallic spring 96 stamped from full hard stainless steel, and comprises four forwardly facing latch ends 98 separated by five respective forwardly facing supporting ends 100. Preferably, each latch end 98 is connected to its two adjacent supporting ends 100 by a serpentine arm 102 defined by suitable radiused cutouts in stamped spring 96 to provide a shape that approximates a constant stress geometry. Each supporting end 100 is terminated by straight edge 104 which is inserted into a corresponding slot 106 (FIG. 7) at the upper rear of cartridge holder 16; because latch assembly 94 is a single unit, only one assembly operation is required for all four cartridge compartments 18. Because of the serpentine shape of the individual serpentine arm 102, it is possible to provide a spring that is relatively compact from front to rear and yet provides a relatively substantial constant force (of approximately 17.3N) over a relatively large deflection range. This compactness contributes in turn to the overall compactness of cartridge holder 16 and thus of inkjet printer 10.

Figure 7:
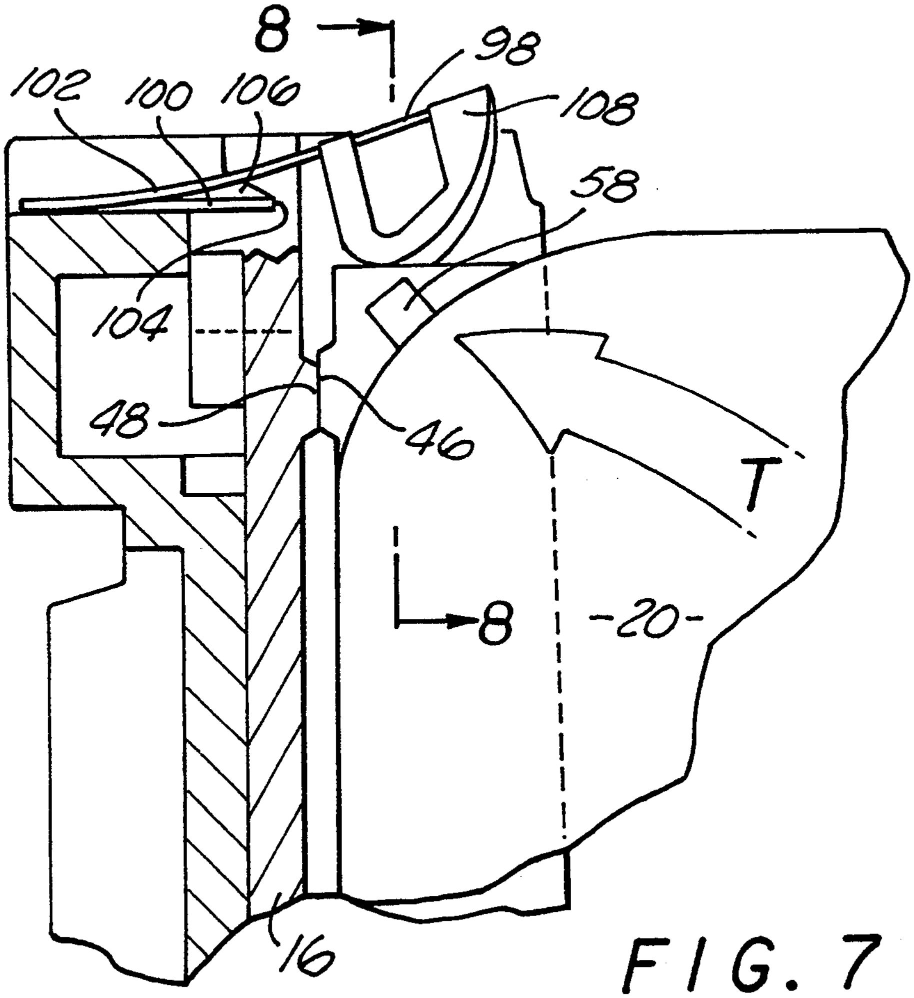
FIG. 7 is a side view, partly in cross section, of the upper rear portion of the cartridge and cartridge holder, showing the cam of the latching spring in contact with a corresponding lip at the top of the cartridge to thereby provide a compound registration force having components in the X and Z axes.

Each latch end 98 is provided with a cam 108 preferably molded of a low friction material such as PTFE filled acetal (in the ratio of 20% PTFE, 80% acetal), which has a coefficient of friction substantially lower than the coefficient of friction of the stainless steel component of the spring. As shown in FIGS. 6, 7 and 8, each molded cam 108 is shaped in the form of a horizontal section of an inclined, sideways oriented cylinder (i.e., a cylinder having its axis parallel to the X axis and tilted about the Y axis). As is best shown in FIG. 8, a lower tangential plane formed by the cylindrical surface intersects the plane of the latch end 98 at an oblique angle of about 15.6°, which is complementary to a corresponding oblique surface 112 of a reenforced lip 114 formed on perimeter wall 64 of cartridge 20 between upper rear datum surface 46 and upper side datum surface 58, thereby producing the sideways component X2 of force F, with the low coefficient of the molded plastic material resulting in a greater net sideways force X2 for a given force F.

When a cartridge 20 is inserted into the cartridge compartment 18 (see also FIGS. 2 and 4) the low coefficient of friction of molded cam 108 permits it to slip over oblique surface 112. Thereupon, serpentine arm 102 exerts a downward force Z and sideways force X2 which through the curved surface onto the cartridge. The downward Z force presses the cartridge 20 downward onto the carriage until it contacts horizontal supporting surface 42, while force Y (11N in an exemplary embodiment) produced by electrical interface 52 presses vertical datum surface 44 against vertical supporting surface 45. As noted previously, since the downwards component Z of force F is offset horizontally in the +Y direction from horizontal datum surface 40 and associated supporting surface 42, the resultant counterforce from supporting surface 42 generates a net torque T (FIG. 7) which rotates cartridges 20 about pivot axis P, thereby forcing upper rear datum surface 46 into contact with sixth supporting surface 48, while the sideways bias force X2 presses upper side datum surface 58 against upper side supporting surface 88 (FIG. 8).

It is understood that the above-described embodiment is merely provided to illustrate the principles of the present invention, and that other embodiments may readily be devised using these principles by those skilled in the art without departing from the scope and spirit of the invention.

What is claimed is:

1. A clamp for securing a pen carried by a printer carriage, comprising:
   - a plurality of latch arms defined in a metallic flat spring, said flat spring defining a generally horizontal spring plane and having a first coefficient of friction, each of the latch arms extending from a forwardly facing latch end to a supporting end; and
   - a respective cam of a low friction plastic material on said latch end of each of said latch arms, said low friction plastic material having a second coefficient of friction substantially less than said first coefficient, said cam having a sideways oriented cylindrical surface defining a lower tangential plane intersecting the spring plane at an oblique angle, whereby said cam applies a holding force on a respective pen having a net sideways force component that is tangential to the spring plane and that is greater than a net force which would result from a similarly oriented surface having a coefficient of friction equal to said first coefficient.

2. A printer carriage, comprising:
   - a cartridge holder for carrying a plurality of pen cartridges along a carriage axis, and
   - a unitary latch mounted to the cartridge holder for simultaneously holding all the cartridges inside the holder, said unitary latch comprising a corresponding plurality of bifurcated serpentine latch arms defined in a flat metallic spring, said flat spring defining a generally horizontal spring plane, each of said latch arms extending from a respective forwardly facing latch end for holding respective said pen cartridges, to a respective forwardly facing supporting end at either side of each of the latch arm secured to said cartridge holder.

3. The printer carriage of claim 2, wherein each supporting end is terminated by a straight edge which is inserted into a corresponding slot at an upper rear portion of cartridge holder.

4. The printer carriage of claim 2, further comprising a cartridge cam on said latch end of each latch arms, said cam being formed of a plastic material having a lower coefficient of friction than said flat metallic spring and having a sideways oriented cylindrical surface defining a lower tangential plane intersecting the spring plane at an oblique angle, for applying both a downward and a sideways force to said respective pen cartridges, whereby said cam applies a holding force on said respective pen cartridges having a net sideways force component that is tangential to the spring plane and that is greater than the sideways force that which would result from a similarly oriented surface having a coefficient of friction equal to said first coefficient.

* * * * *